US011599439B2

(12) United States Patent
Opushnyev et al.

(10) Patent No.: US 11,599,439 B2
(45) Date of Patent: Mar. 7, 2023

(54) UNIVERSAL DEVICE IDENTIFIER SERVICE WITH ADJUSTED ATTRIBUTE DISTANCES

(71) Applicant: MASTERCARD TECHNOLOGIES CANADA ULC, Vancouver (CA)

(72) Inventors: Igor Opushnyev, New Westminster (CA); John Hearty, Vancouver (CA); Anton Laptiev, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 17/524,900

(22) Filed: Nov. 12, 2021

(65) Prior Publication Data
US 2022/0156170 A1     May 19, 2022

Related U.S. Application Data

(60) Provisional application No. 63/113,576, filed on Nov. 13, 2020.

(51) Int. Cl.
*G06F 11/30* (2006.01)

(52) U.S. Cl.
CPC ...... *G06F 11/3051* (2013.01); *G06F 11/3024* (2013.01)

(58) Field of Classification Search
CPC .. G06F 11/30; G06F 11/3051; G06F 11/3055; G06F 11/3058; G06F 11/3062; G06F 11/3065; G06F 11/3068; G06F 11/3072; G06F 11/3075
See application file for complete search history.

(56) References Cited

U.S. PATENT DOCUMENTS

| 10,580,004 | B2 | 3/2020 | Skvortsov et al. | |
| 2005/0044194 | A1* | 2/2005 | Baldiga | H04L 9/40 |
| | | | | 709/226 |
| 2009/0300066 | A1* | 12/2009 | Guo | H04L 61/50 |
| 2019/0042637 | A1* | 2/2019 | Ullrich | G06F 16/27 |

(Continued)

OTHER PUBLICATIONS

International Search Report and Written Opinion for Application No. PCT/CA2021/051605 dated Jan. 27, 2022 (10 pages).

*Primary Examiner* — Raymond N Phan
(74) *Attorney, Agent, or Firm* — Michael Best & Friedrich LLP

(57) ABSTRACT

A universal device identifier (UDID) service with adjusted attribute distances. In one embodiment, a server includes an electronic processor and a memory storing the UDID service. The electronic processor is configured to receive an identification request regarding a currently-observed device having a first set of device attributes, retrieve any previously-observed devices, determine whether one or more devices are found from retrieving the any of the previously-observed devices, determine all changed device attributes for each device of the one or more devices that are found relative to the first set of device attributes, generate an adjusted attribute distance corresponding to the all changed device attributes for the each device, retrieve a universal device identifier (UDID) of a closest device having a lowest adjusted attribute distance among all adjusted attribute distances that are generated, and assign the UDID of the closest device to the currently-observed device.

20 Claims, 6 Drawing Sheets

(56) References Cited

U.S. PATENT DOCUMENTS

2020/0112562 A1   4/2020  Hearty et al.
2022/0038454 A1*  2/2022  Kuarsingh .............. H04L 63/20
2022/0308726 A1*  9/2022  Gur .................... G06F 3/04162

* cited by examiner

FIG. 5

| Request | Attributes | | | | | |
|---|---|---|---|---|---|---|
| | IP | Screen resolution | OS | OS Version | Browser | Timezone |
| Previously seen | 10.0.0.1 | 1200x800 | Android | 5.1 | Chrome | PST |
| Current | 10.0.0.2 | 1285x800 | Android | 6.0 | Chrome | PST |

502A: IP
502B: Screen resolution
502C: OS
502: OS Version
502D: (Attributes)
502E: Browser
502F: Timezone
504: Previously seen
506: Current
500

FIG. 6

| Changed Device Attributes | Adjusted Attribute Distances |
|---|---|
| IP, Location, Timezone | 1 |
| Screen resolution | 10 |
| OS | 100 |
| IP, Browser | 50 |
| IP, OS Version | 5 |
| ... | ... |

602: Changed Device Attributes
604: Adjusted Attribute Distances
606: IP, Location, Timezone
608: Screen resolution
610: OS
612: IP, Browser
614: IP, OS Version
616, 618, 620, 622, 624
600

UNIVERSAL DEVICE IDENTIFIER SERVICE WITH ADJUSTED ATTRIBUTE DISTANCES

CROSS-REFERENCE TO RELATED APPLICATION

This application claims priority to, and the benefit of, U.S. Provisional Application No. 63/113,576, filed on Nov. 13, 2020, the entire contents of which is incorporated herein by reference.

FIELD OF THE INVENTION

The present disclosure relates generally to device identification. More specifically, the present disclosure relates to device identification using a universal device identifier service with adjusted attribute distances.

BACKGROUND

Device identification is made difficult in view of changing device attributes. Conventionally, device identification is addressed using invasive identification techniques, for example, the use of stored electronic signatures.

SUMMARY

Embodiments described herein relate to a universal device identifier service with adjusted attribute distances (also referred to as "UDID service"). This is a non-invasive technique that persistently and accurately identifies devices without relying on stored electronic signatures. The UDID service analyzes a user's device to map attributes of the user's device to a multidimensional parameter space and identifies a degree of change through a distance in the multidimensional parameter space (also referred to herein as an "adjusted attribute distance"). Additionally, the UDID service identifies a previously-observed device with the lowest adjusted attribute distance (i.e., the smallest degree of change in the multidimensional parameter space), and uses the UDID associated with the previously-observed device with the lowest adjusted attribute distance, which provides real-time and consistent device identification even when attributes of the user's device change over time.

One significant improvement in the UDID service over conventional device identification techniques is a reduction, or an elimination, of a need for stored electronic signatures because the UDID service provides real-time and consistent device identification even when attributes of the user's device change over time. A second significant improvement in the UDID service is the improvement of the adjusted attribute distance over the natural drift Raw Levenshtein distance because the adjusted attribute distance is more accurate and more efficient at determining the previously-observed device that is closest to the currently-observed device.

Additionally, there are several improvements over universal device identifier (UDID) that only use scope restrictors (device attributes) to identify a previously observed device. First, the UDID service of the present disclosure may search for the same device in historical records and is not limited by any scope restrictors. In this way, the UDID service of the present disclosure may determine a globally unique UDID for a device, which is not possible when only using scope restrictors.

Second, the UDID service of the present disclosure is not limited to comparing an observed device attributes on a one-by-one basis. Instead, the UDID service identifies the same device by measuring distance in a multi-dimensional attributes space between the observed device and previously observed devices. Further, the UDID adjusts the measured attributes distance between the devices with coefficients determined based on device attribute change probabilities unlike UDID that only use scope restrictors and are based on comparing raw similarity between devices.

Third, the UDID service of the present disclosure does not require specific device attributes. Instead, the UDID service of the present disclosure may determine a UDID of a device using any available device attributes.

One embodiment described herein is a server including an electronic processor and a memory. The memory includes a universal device identifier (UDID) service. The electronic processor, when executing the UDID service, is configured to receive an identification request regarding a currently-observed device having a first set of device attributes, retrieve any previously-observed devices with device attributes within a threshold attributes distance based on the first set of device attributes, determine whether one or more devices are found from retrieving the any of the previously-observed devices, determine all changed device attributes for each device of the one or more devices that are found relative to the first set of device attributes, generate an adjusted attribute distance corresponding to the all changed device attributes for the each device of the one or more devices that are found, retrieve a UDID of a closest device of the one or more devices that are found, the closest device having a lowest adjusted attribute distance among all adjusted attribute distances that are generated, and assign the UDID of the closest device to the currently-observed device.

Another embodiment described herein is a method. The method includes receiving, with an electronic processor executing a universal device identifier (UDID) service, an identification request regarding a currently-observed device having a first set of device attributes. The method includes retrieving, with the electronic processor executing the UDID service, any previously-observed devices with device attributes within a threshold attributes distance based on the first set of device attributes. The method includes determining, with the electronic processor executing the UDID service, whether one or more devices are found from retrieving the any of the previously-observed devices. The method includes determining, with the electronic processor executing the UDID service, all changed device attributes for each device of the one or more devices that are found relative to the first set of device attributes. The method includes generating, with the electronic processor executing the UDID service, an adjusted attribute distance corresponding to the all changed device attributes for the each device of the one or more devices that are found. The method includes retrieving, with the electronic processor executing the UDID service, a UDID of a closest device of the one or more devices that are found, the closest device having a lowest adjusted attribute distance among all adjusted attribute distances that are generated. The method also includes assigning, with the electronic processor executing the UDID service, the UDID of the closest device to the currently-observed device.

Yet another embodiment described herein is a non-transitory computer-readable medium comprising instructions that, when executed by a server, cause the server to perform a set of operations. The set of operations includes receiving, with an electronic processor executing a universal device identifier (UDID) service, an identification request regarding a currently-observed device having a first set of device attributes. The set of operations includes retrieving, with the electronic processor executing the UDID service, any previously-observed devices with device attributes within a threshold attributes distance based on the first set of device attributes. The set of operations includes determining, with the electronic processor executing the UDID service, whether one or more devices are found from retrieving the any of the previously-observed devices. The set of operations includes determining, with the electronic processor executing the UDID service, all changed device attributes for each device of the one or more devices that are found relative to the first set of device attributes. The set of operations includes generating, with the electronic processor executing the UDID service, an adjusted attribute distance corresponding to the all changed device attributes for the each device of the one or more devices that are found. The set of operations includes retrieving, with the electronic processor executing the UDID service, a UDID of a closest device of the one or more devices that are found, the closest device having a lowest adjusted attribute distance among all adjusted attribute distances that are generated. The set of operations also includes assigning, with the electronic processor executing the UDID service, the UDID of the closest device to the currently-observed device.

Other aspects of the embodiments will become apparent by consideration of the detailed description and accompanying drawings.

BRIEF DESCRIPTION OF THE DRAWINGS

FIG. 5 is a diagram that illustrates an example of a natural drift Raw Levenshtein distance.

FIG. 6 is a diagram that illustrates an example of an adjusted attribute distance, according to embodiments described herein.

DETAILED DESCRIPTION

Embodiments described herein relate to a universal device identifier (also referred to as "UDID service") for a system, and environments and systems utilizing this service. The UDID service analyzes device attributes of a user device, evaluating numerous device attributes of a currently-observed device. These device attributes capture a variety of distinctive markers that may be used to predict whether the currently-observed user device is a previously-observed user device or a newly observed user device.

Figure 1:
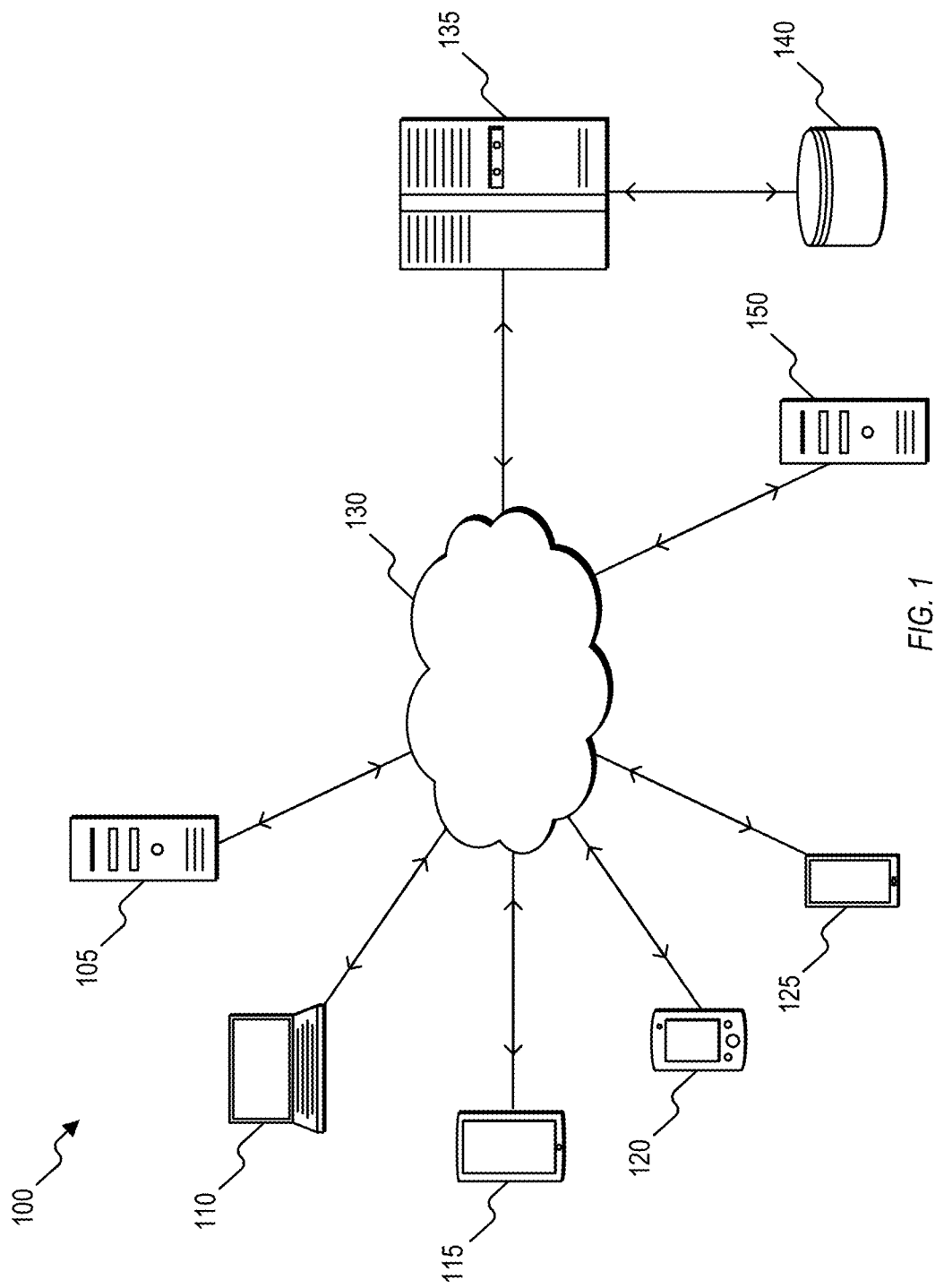
FIG. 1 is a diagram that illustrates a system for a UDID service that evaluates a user's device, according to embodiments described herein.

FIG. 1 illustrates a system 100 for a UDID service that evaluates a user's device, according to embodiments described herein. The system 100 includes a plurality of user devices 105-125, a network 130, a server 135, a database 140, and a client server 150. The plurality of user devices 105-125 include, for example, a personal, desktop computer 105, a laptop computer 110, a tablet computer 115, a personal digital assistant ("PDA") (e.g., an iPod touch, an e-reader, etc.) 120, and a mobile phone (e.g., a smart phone) 125. Each of the user devices 105-125 is configured to communicatively connect to the server 135 through the network 130 and provide information to the server 135 related to attributes or values for attributes of the user devices 105-125. Device attributes of the user devices 105-125 include, for example, user agent, operating system, location, time of day, mouse location, or other suitable device attribute information regarding the user device. Device attribute information received from the user devices 105-125 at the server 135 may be stored in the database 140.

The network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 130 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a Digital Enhanced Cordless Telecommunications ("DECT") network, a Digital AMPS ("IS-136/TDMA") network, or an Integrated Digital Enhanced Network ("iDEN") network, etc.

The connections between the user devices 105-125 and the network 130 are, for example, wired connections, wireless connections, or a combination of wireless and wired connections. The connection between the server 135 and the network 130 is a wired connection, wireless connection, or a combination of wireless and wired connections. The connection between the client server 150 and the network 130 is a wired connection, wireless connection, or a combination of wireless and wired connections.

The client server 150 is a server of a resource provider. For example, the client server 150 is a bank server that provides access to a credit card online account to a user of the credit card online account. However, any server-side resource may be considered in place of the "credit card online account."

Figure 2:
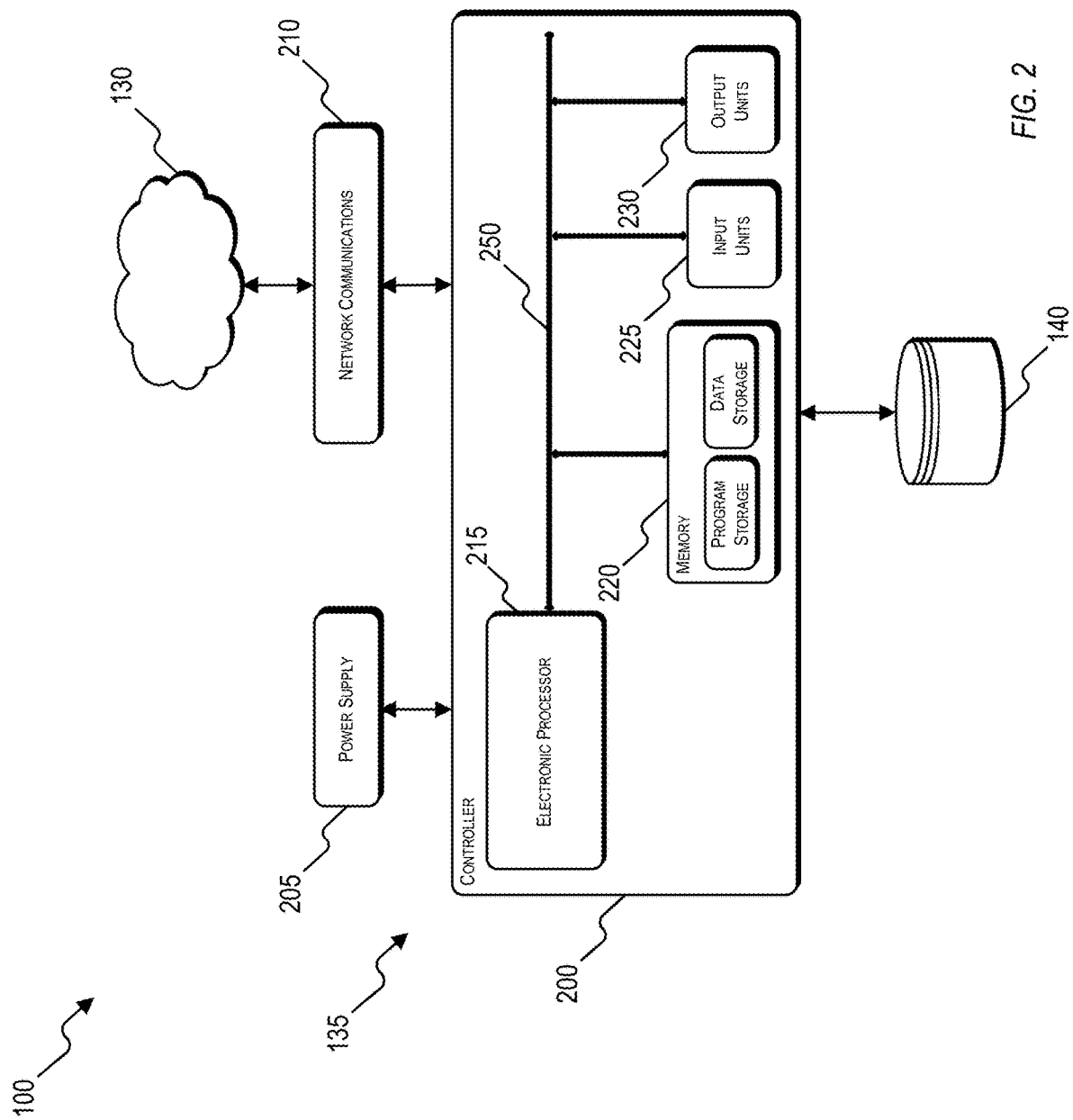
FIG. 2 is a block diagram that illustrates the server of the system of FIG. 1, according to embodiments described herein.

FIG. 2 is a block diagram that illustrates the server 135 of the system 100 of FIG. 1. The server 135 is electrically and/or communicatively connected to a variety of modules or components of the system 100. For example, the illustrated server 135 is connected to the database 140. The server 135 includes a controller 200, a power supply module 205, and a network communications module 210. The controller 200 includes combinations of hardware and software that are configured to, for example, provide the UDID service to evaluate the device attributes of the devices 105-125. For example, the UDID service may evaluate the device attributes of the devices 105-125 while the users are attempting to access a server-side resource (e.g., respective online accounts). The controller 200 includes a plurality of electrical and electronic components that provide power, operational control, and protection to the components and modules within the controller 200 and/or the system 100. For example, the controller 200 includes, among other things, an electronic processor 215 (e.g., a microprocessor, a microcontroller, or other suitable processing device), a memory 220, input units 225, and output units 230. The electronic processor 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes.

The memory 220 is a non-transitory computer-readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. In some examples, the program storage area may store the instructions regarding the UDID service program (referred to herein as "UDID service") as described in greater detail below.

The electronic processor 215 executes machine-readable instructions stored in the memory 220. For example, the electronic processor 215 may execute instructions stored in the memory 220 to perform the functionality of the UDID service as described below.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the UDID service described herein.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also configured to supply lower voltages to operate circuits and components within the controller 200 or system 100.

The server 135 is configured to perform the UDID service to evaluate the attributes of a user device, evaluating a broad set of attributes that enable the UDID service to distinguish between a previously-observed user device and a newly observed user device. By looking at changes in attributes over time, the server 135 is able to confirm whether a currently-observed user device is a previously-observed user device or a new user device that needs a new UDID.

The following data points are an illustrative subset of the attributes that may be used by the server 135 in performing the UDID service to determine whether the user device has been previously-observed: 1) internet protocol (IP) address, 2) screen resolution, 3) type of operating system, 4) version of operating system, 5) type of browser, and 6) time zone.

Figure 3:
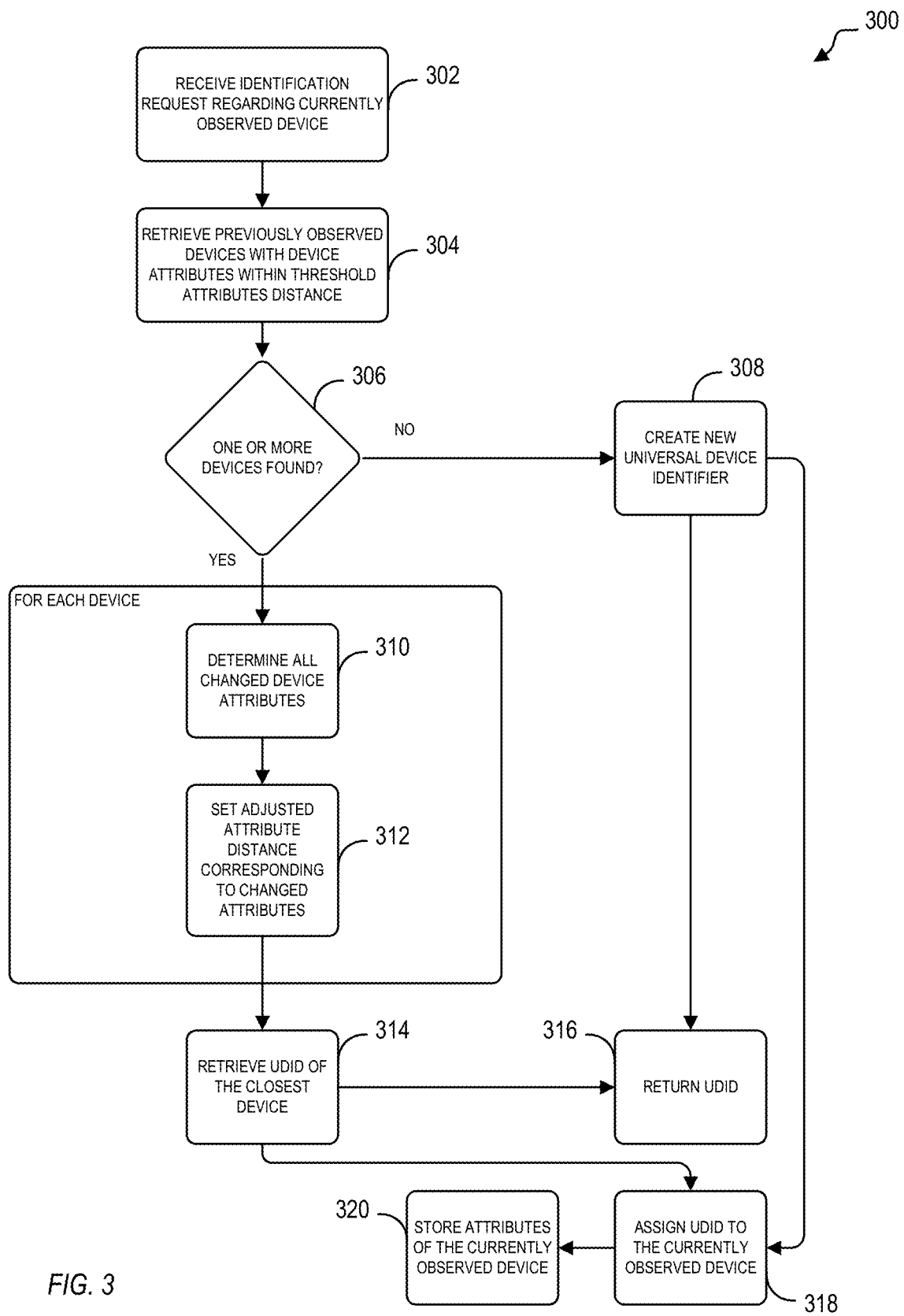
FIG. 3 is a flowchart that illustrates a method for performing the UDID service to evaluate a user's device, according to embodiments described herein.

The UDID service executed by the server 135 includes a method for determining whether the currently-observed user device is a previously-observed user device or a newly observed user device. FIG. 3 is a flowchart that illustrates a method 300 for performing the UDID service to evaluate a user's device, according to embodiments described herein. The method 300 is described with respect to the server 135 of FIGS. 1 and 2.

The method 300 includes the server 135 receiving an identification request regarding a currently-observed device (at block 302). For example, the server 135 receives an identification request from a computing device regarding a currently-observed device with a first set of device attributes.

The method 300 includes the server 135 retrieving any previously-observed devices with device attributes within a threshold attributes distance based on the first set of device attributes in response to detecting the currently-observed device with the first set of device attributes (at block 304). For example, the server 135 may query the database 140 to retrieve any previously-observed devices with respective device attributes that are within a threshold attributes distance based on the first set of device attributes. For example, the threshold attributes distance is an edit distance (also referred to herein as the "natural drift Raw Levenshtein distance," which is the number of edits between attributes) of less than or equal to 2.

The method 300 includes the server 135 determining whether one or more devices are found from retrieving any previously-observed devices (at decision block 306). For example, the server 135 determines whether the query of the database 140 returns any results.

In response to determining that one or more devices are not found ("No" at decision block 306), the method 300 includes the server 135 creating a new universal device identifier (UDID) (at block 308). For example, when the server 135 determines that the query of the database 140 returns no results, the server 135 creates a new UDID for the currently-observed device.

In response to determining that one or more devices are found ("Yes" at decision block 306), the method 300 includes the server 135 determining all changed device attributes for each device relative to the first set of device attributes (at block 310). For example, the server 135 compares the first set of device attributes of the currently-observed device to the attributes associated with each device that is returned from querying the database 140 to determine all changed device attributes between each device that is returned from querying the database 140 and the currently-observed device.

In some examples, the server 135 may retrieve only the previously-observed devices have been associated with the computing device. For example, when a number of the one or more devices are above a threshold amount (e.g., one hundred previously-observed devices), the server 135 may limit determining all changed device attributes for each device relative to the first set of device attributes to only the previously-observed devices that have been previously associated with the computing device.

Additionally, after determining the all changed device attributes for each device (at block 312), the method 300 includes the server 135 generating an adjusted attribute distance corresponding to the all changed device attributes for each device. For example, the server 135 generates an adjusted attribute distance corresponding to the all changed device attributes for each device returned from querying the database 140.

In response to generating an adjusted attribute distance corresponding to the one all changed device attributes for each device, the method 300 includes the server 135 retrieving the UDID of the closest device (at block 314). For example, the server 135 selects a device with the lowest adjusted attribute distance and queries the database 140 for the UDID of the device with the lowest adjusted attribute distance.

After either creating a new universal device identifier (UDID) (at block 308) or retrieving the UDID of the closest device (at block 314), the method 300 includes the server 135 returning the UDID (316). For example, the server 135 returns the new UDID or the UDID of the closest device to the computing device that transmitted the identification request regarding the currently observed device having the first set of device attributes.

Additionally, after either creating a new universal device identifier (UDID) (at block 308) or retrieving the UDID of the closest device (at block 314), the method 300 includes the server 135 assigning the retrieved UDID or the created UDID to the currently-observed device (318). For example, the server 135 assigns the UDID returned from the database 140 or the new UDID to the currently-observed device and stores the assignment in the database 140.

The method 300 also includes the server 135 storing attributes of the currently-observed device (320). For example, the server 135 may query the database 140 to store the first set of device attributes with the currently-observed device.

Figure 4:
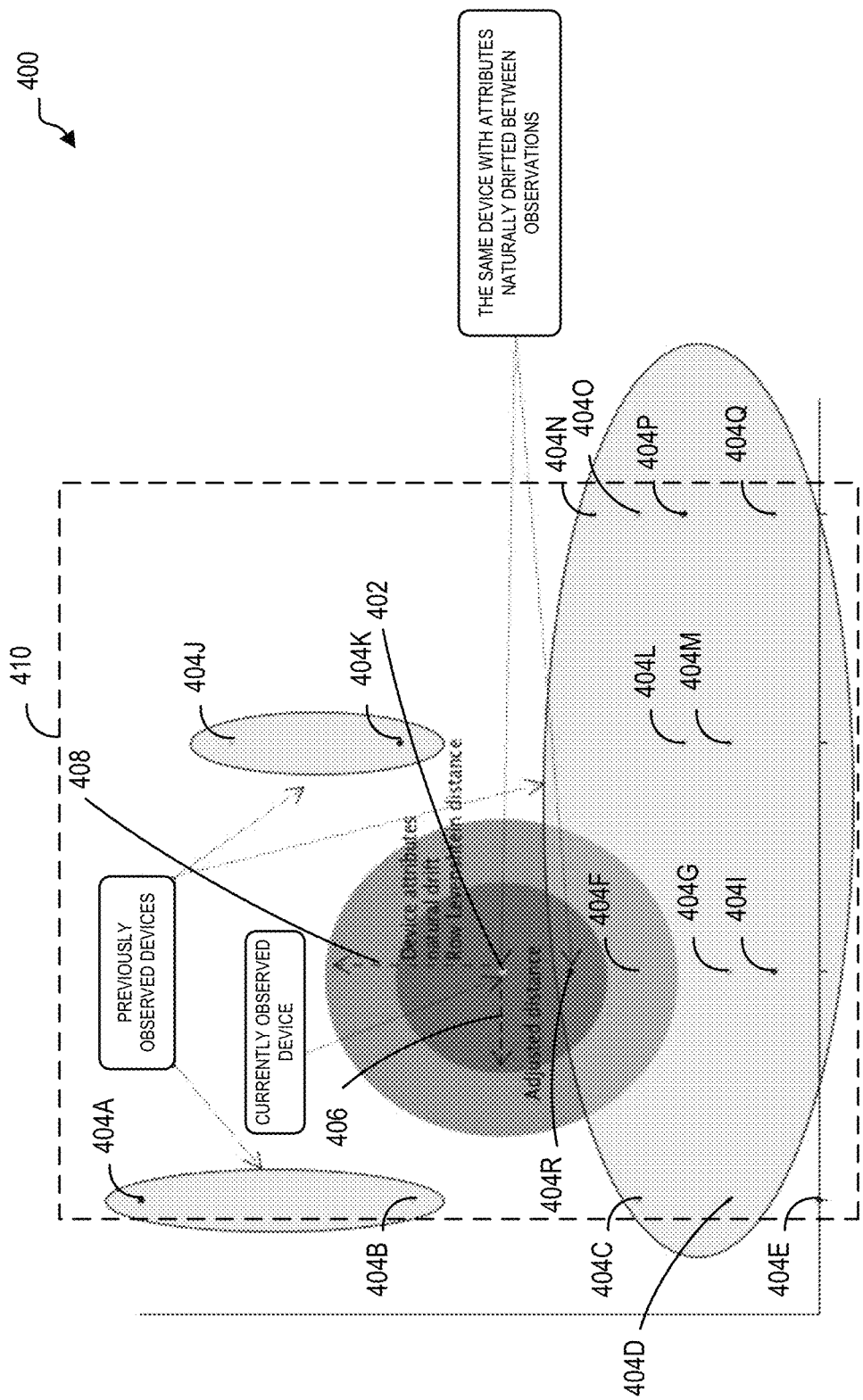
FIG. 4 is a diagram that illustrates the method of FIG. 3 in a two-dimensional space, according to embodiments described herein.

FIG. 4 is a diagram that illustrates the method 300 of FIG. 3 in a two-dimensional space 400, according to embodiments described herein. Each axis of the two-dimensional space 400 represents a number of edits (i.e., an edit distance or natural drift Raw Levenshtein distance) between different devices. The number of edits represent an amount of identifiers one would need to change to transform one identifier value into another.

As illustrated in FIG. 4, the two-dimensional space includes a currently-observed device 402, a plurality of previously-observed devices 404A-404R, an adjusted attribute distance 406, a natural drift Raw Levenshtein distance 408, and a threshold attributes distance 410. For example, the threshold attributes distance 410 is 2.

The server 135 receives an identification request regarding a currently-observed device 402 with a first set of device attributes in the two dimensional space 400. The server 135 retrieves the plurality of previously-observed devices 404A-404R from the database 140 that have device attributes that are within the threshold attribute distance 410 based on the first set of device attributes. The server 135 compares the first set of device attributes of the currently-observed device 402 to the device attributes associated with each of the plurality of previously-observed devices 404A-404R to determine changes in device attributes. The lack of any difference between the first set of device attributes of the currently-observed device 402 and the device attributes associated with one of the plurality of previously-observed devices 404A-404R is a strong indication that the currently-observed device 402 is the same device as the one of the plurality of previously-observed devices 404A-404R.

The server 135 generates an adjusted attribute distance corresponding to the all changed device attributes for each of the plurality of previously-observed devices 404A-404R. Lastly, the server 135 selects a device with the lowest adjusted attribute distance (e.g., the previously-observed device 404R) and queries the database 140 for the UDID of the previously-observed device 404R.

As illustrated in FIG. 4, the adjusted attribute distance 406 includes only the currently-observed device 402 and the previously-observed device 404R. This inclusion of just the currently-observed device 402 and the previously-observed device 404R based on the adjusted attribute distance 406 allows the server 135 to determine the closest previously-observed device is previously-observed device 404R. Unlike the adjusted attribute distance 406, a natural drift Raw Levenshtein distance 408 would likely include more than one previously-observed device (e.g., the previously-observed device 404R and the previously-observed device 404F), which requires the server 135 to further differentiate between the previously-observed device 404R and the previously-observed device 404F. FIG. 5 is a diagram that illustrates an example 500 of a natural drift Raw Levenshtein distance. The natural drift Raw Levenshtein distance is conventionally applied to strings of characters. Unlike the conventional techniques, the natural drift Raw Levenshtein distance is applied to device attributes, and specifically, changes in device attributes.

The example 500 includes attributes 502 associated with a previously-observed device 504 and a currently-observed device 506, respectively. The attributes 502 include an internet protocol (IP) address attribute 502A, a screen resolution attribute 502B, an operating system attribute 502C, an operating system version attribute 502D, a browser type attribute 502E, and a time-zone attribute 502F.

The IP address attribute 502A of the previously-observed device 504 is 10.10.10.1. The screen resolution attribute 502B of the previously-observed device 504 is 1280×800. The operating system attribute 502C of the previously-observed device 504 is Android. The operating system version attribute 502D of the previously-observed device 504 is version 5.1. The browser type attribute 502E of the previously-observed device 504 is Chrome. Lastly, the time-zone attribute 502F of the previously-observed device 504 is Pacific Standard Time (PST).

The IP address attribute 502A of the currently-observed device 506 is 10.10.10.2. The screen resolution attribute 502B of the currently-observed device 506 is 1280×800. The operating system attribute 502C of the currently-observed device 506 is Android. The operating system version attribute 502D of the currently-observed device 506 is version 6.0. The browser type attribute 502E of the currently-observed device 506 is Chrome. Lastly, the time-zone attribute 502F of the currently-observed device 506 is Pacific Standard Time (PST).

The natural drift Raw Levenshtein distance (e.g., the natural drift Raw Levenshtein distance 408 of FIG. 4) between the previously-observed device 504 and the currently-observed device 506 is two because the IP address attribute 502A and the operating system version attribute 502D have different values between the previously-observed device 504 and the currently-observed device 506. The natural drift Raw Levenshtein distance treats all of the changes the same even though some changed device attributes are more likely to indicate a different device than other changed device attributes. Therefore, while the natural drift Raw Levenshtein distance may be used to identify a device, this distance is not as accurate or persistent because the attributes are not weighted.

FIG. 6 is a diagram that illustrates an example 600 of an adjusted attribute distance, according to embodiments described herein. The example 600 includes a changed device attributes section 602 and an adjusted attribute distance section 604 that form a matrix of changed device attributes between a previously-observed device and a currently-observed device. In some examples, the example 600 is an example lookup table storing possible combinations of changed device attributes and corresponding adjusted attribute distances. Additionally, in some examples, the example lookup table applies equally to different device types.

In other examples, the example lookup table applies to only one device type from a plurality of device types. In these examples, a plurality of lookup tables may each define the adjusted attribute distance for each device type (e.g., a personal computer device type, a smartphone device type, a tablet device type, a game console device type, or other suitable device type). In other words, the adjusted attribute distances may be different for different device types for the same changed attributes.

The changed device attributes section 602 includes some or all of the possible combinations of the following attributes: 1) an internet protocol (IP) address attribute, 2) a location attribute, 3) a screen resolution attribute, 4) an operating system type attribute, 5) an operating system version attribute, 6) a browser type attribute, and 7) a time zone attribute. The adjusted attribute distance section 604 includes a specific adjusted attribute distance that pertains to each of the combinations in the changed device attributes section 602.

As illustrated in FIG. 6, the changed device attributes section 602 includes a first row 606 with changes in the IP address attribute, the location attribute, and the time zone attribute. A second row 608 of the changed device attributes section 602 includes a change in the screen resolution attribute. A third row 610 of the changed device attributes section 602 includes a change in the operating system attribute. A fourth row 612 of the changed device attributes section 602 includes a change in the IP address attribute and the browser type attribute. A fifth row 614 of the changed device attributes section 602 includes a change in the IP address attribute and the operating system version attribute.

As illustrated in FIG. 6, the adjusted attribute distance section 604 includes a first row 616 with a first attribute distance that corresponds to the first row 606 (e.g., the first attribute distance is a distance of 1). A second row 618 with a second attribute distance that corresponds to the second row 608 (e.g., the second attribute distance is a distance of 10). A third row 620 with a third attribute distance that corresponds to the third row 610 (e.g., the third attribute distance is a distance of 100). A fourth row 622 of the adjusted attribute distance section 604 with a fourth attribute distance that corresponds to the fourth row 612 (e.g., the fourth attribute distance is a distance of 50). A fifth row 624 of the adjusted attribute distance section 604 with a fifth attribute distance that corresponds to the fifth row 614 (e.g., the fifth attribute distance is a distance of 5).

Additionally, as illustrated in FIG. 6, the adjusted attribute distance (e.g., the adjusted attribute distance 406 of FIG. 4 between the previously-observed device 404F and the currently-observed device 404R) is a distance of 5 because the all changed device attributes are the IP address attribute and the operating system version attribute that are indicative of only a small change between the currently-observed device is different from the previously-observed device. For example, while the adjusted attribute distance in the example 600 is 5, unlike the natural drift Raw Levenshtein distance, the adjusted attribute distance in the example 600 has a range between 1 and 100, where 1 is indicative of the smallest change between the currently-observed device and the previously-observed device and 100 is indicative of the largest change between the currently-observed device and the previously-observed device.

Consequently, a change in only the operating system attribute would provide a natural drift Raw Levenshtein distance of 1 in the example 500 and an adjusted attribute distance of 100 in the example 600. In other words, a changed attribute that is indicative of the largest change between the currently-observed device and the previously-observed device (e.g., an adjusted attribute distance of 100 in the example 600) is by itself, in the example 500, less likely to indicate a difference between the currently-observed device and the previously-observed device than changes in two device attributes that are indicative of a very small change. The adjusted attribute distance is advantageous and an improvement over the natural drift Raw Levenshtein distance because the adjusted attribute distance is more accurate and more efficient at determining the previously-observed device that is closest to the currently-observed device.

Figure 7:
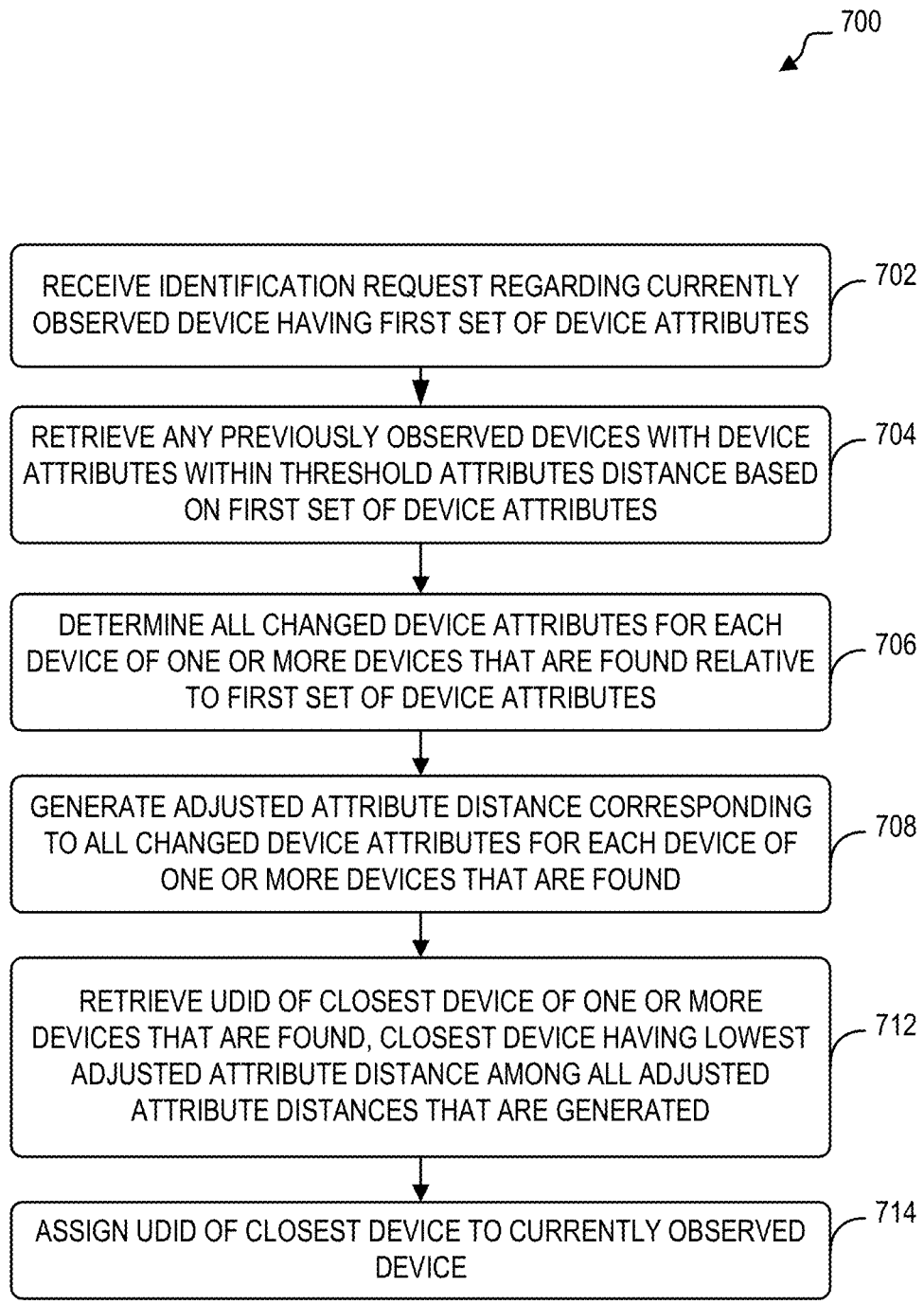
FIG. 7 is a flowchart that illustrates a method for performing the UDID service to evaluate a user's device, according to embodiments described herein.

FIG. 7 is a flowchart that illustrates a method 700 for performing the UDID service to evaluate a user's device, according to embodiments described herein. The method 700 is described with respect to the server 135 of FIGS. 1, 2, 5, and 6.

The method 700 includes the server 135 receiving, with an electronic processor executing a universal device identifier (UDID) service, an identification request regarding a currently-observed device having a first set of device attributes (at block 702). For example, the server 135 receives, with the electronic processor 215 executing a universal device identifier (UDID) service, an identification request regarding the currently-observed device 506 (e.g., one of the plurality of user devices 105-125), the currently-observed device 506 having an IP address attribute of 10.10.10.2, a screen resolution attribute of 1280×800, an operating system attribute of Android, an operating system version attribute of 6.0, a browser attribute of Chrome, and a time zone attribute of pacific standard time (PST).

The method 700 includes retrieving, with the electronic processor executing the UDID service, any previously-observed devices with device attributes within a threshold attributes distance based on the first set of device attributes (at block 704). For example, the server 135 retrieves, with the electronic processor 215 executing the UDID service, the previously-observed device 504 when the device attributes of the previously-observed device 504 are within a threshold attributes distance based on the first set of device attributes.

The method 700 includes determining, with the electronic processor executing the UDID service, whether one or more devices are found from retrieving any of the previously-observed devices (at block 706). For example, the server 135 determines, with the electronic processor 215 executing the UDID service, that the previously-observed device 504 is one of several previously-observed devices associated with a user account.

The method 700 includes determining, with the electronic processor executing the UDID service, all changed device attributes for each device of the one or more devices that are found relative to the first set of device attributes (at block 708). For example, the server 135 determines, with the electronic processor 215 executing the UDID service, that the IP address attribute 502A and the operating system version attribute 502D has changed between the currently-observed device 506 and the previously-observed device 504. Specifically, the IP address attribute 502A of the currently-observed device 506 is 10.10.10.2 instead of 10.10.10.1 and the operating system version attribute 502 is 6.0 instead of 5.1, which corresponds to the changed device attributes in the fifth row 614 of the example 600 of adjusted attribute distancing.

The method 700 includes generating, with the electronic processor executing the UDID service, an adjusted attribute distance corresponding to the all changed device attributes for the each device of the one or more devices that are found (at block 710). For example, the server 135 generates, with the electronic processor 215 executing the UDID service, an adjusted attribute distance between the currently-observed device 506 and the previously-observed device 504 has a value of 5, which is illustrated in the corresponding fifth row 624 of the adjusted attribute distance section 604.

The method 700 includes retrieving, with the electronic processor executing the UDID service, a UDID of a closest device of the one or more devices that are found, the closest device having a lowest adjusted attribute distance among all adjusted attribute distances that are generated (at block 712). For example, assuming the previously-observed device 504 is the closest device among all of the previously-observed devices, the server 135 retrieves, with the electronic processor 215 executing the UDID service, the UDID of the previously-observed device 504.

The method 700 also includes assigning, with the electronic processor executing the UDID service, the UDID of the closest device to the currently-observed device (at block 714). For example, the server 135 assigns, with the electronic processor 215 executing the UDID service, the UDID of the previously-observed device 504 to the currently-observed device 506 by storing the UDID of the previously-observed device 504 as the UDID of the currently-observed device 506 in the database 140.

In some examples, the method 700 may further include creating, with the electronic processor executing the UDID service, a new universal device identifier (UDID) in response to determining that the one or more devices are not found from retrieving any of the previously-observed devices, and assigning, with the electronic processor executing the UDID service, the new UDID to the currently-observed device. In these examples, the method 700 may further include storing, with the electronic processor executing the UDID service, the new UDID and the first set of device attributes in the database 140.

In some examples, the method 700 may further include storing, with the electronic processor executing the UDID service, the UDID and the first set of device attributes in a database.

The following are enumerated examples of devices, methods, and non-transitory computer-readable media as described herein. Example 1: a server comprising: an electronic processor; and a memory, the memory including a universal device identifier (UDID) service, wherein, when executing the UDID service, the electronic processor is configured to receive an identification request regarding a currently-observed device having a first set of device attributes, retrieve any previously-observed devices with device attributes within a threshold attributes distance based on the first set of device attributes, determine whether one or more devices are found from retrieving the any of the previously-observed devices, determine all changed device attributes for each device of the one or more devices that are found relative to the first set of device attributes, generate an adjusted attribute distance corresponding to the all changed device attributes for the each device of the one or more devices that are found, retrieve a UDID of a closest device of the one or more devices that are found, the closest device having a lowest adjusted attribute distance among all adjusted attribute distances that are generated, and assign the UDID of the closest device to the currently-observed device.

Example 2: the server of Example 1, wherein, when executing the UDID service, the electronic processor is configured to create a new UDID in response to determining that the one or more devices are not found from retrieving the any of the previously-observed devices, and assign the new UDID to the currently-observed device.

Example 3: the server of Example 2, wherein, when executing the UDID service, the electronic processor is further configured to store the new UDID and the first set of device attributes in a database.

Example 4: the server of any of Examples 1-3, wherein, when executing the UDID service, the electronic processor is further configured to store the UDID and the first set of device attributes in a database.

Example 5: the server of any of Examples 1-4, wherein the one or more devices that are found from retrieving the any of the previously-observed devices include respective one or more sets of device attributes.

Example 6: the server of Example 5, wherein, to determine the all changed device attributes for the each device of the one or more devices that are found relative to the first set of device attributes, the electronic processor is further configured to compare each of the respective one or more sets of device attributes to the first set of device attributes to determine the all changed device attributes between the respective one or more sets of device attributes and the first set of device attributes.

Example 7: the server of Example 6, wherein the first set of device attributes and the respective one or more sets of device attributes individually include a plurality of device attributes selected from a group consisting of: an internet protocol (IP) address attribute, a location attribute, a screen resolution attribute, an operating system type attribute, an operating system version attribute, a browser type attribute, and a time zone attribute.

Example 8: the server of Example 7, wherein the adjusted attribute distance that is generated has a value between one and one-hundred, wherein the adjusted attribute distance is indicative of the smallest change between the currently-observed device and the one or more devices when the value is one, and wherein the adjusted attribute distance is indicative of the largest change between the currently-observed device and the one or more devices when the value is one-hundred.

Example 9: the server of Example 8, wherein the adjusted attribute distance has the value of one when the all changed device attributes includes only the IP address attribute, the location attribute, and the time zone attribute, wherein the adjusted attribute distance has the value of ten when the all changed device attributes includes only the screen resolution attribute, wherein the adjusted attribute distance has the value of one-hundred when the all changed device attributes includes only the operating system type attribute, wherein the adjusted attribute distance has the value of fifty when the all changed device attributes includes only the IP address attribute and the browser type attribute, and wherein the adjusted attribute distance has the value of five when the all changed device attributes includes only the IP address attribute and the operating system version attribute.

Example 10: a method comprising: receiving, with an electronic processor executing a universal device identifier (UDID) service, an identification request regarding a currently-observed device having a first set of device attributes; retrieving, with the electronic processor executing the UDID service, any previously-observed devices with device attributes within a threshold attributes distance based on the first set of device attributes; determining, with the electronic processor executing the UDID service, whether one or more devices are found from retrieving the any of the previously-observed devices; determining, with the electronic processor executing the UDID service, all changed device attributes for each device of the one or more devices that are found relative to the first set of device attributes; generating, with the electronic processor executing the UDID service, an adjusted attribute distance corresponding to the all changed device attributes for the each device of the one or more devices that are found; retrieving, with the electronic processor executing the UDID service, a UDID of a closest device of the one or more devices that are found, the closest device having a lowest adjusted attribute distance among all adjusted attribute distances that are generated; and assigning, with the electronic processor executing the UDID service, the UDID of the closest device to the currently-observed device.

Example 11: the method of Example 10, further comprising: creating, with the electronic processor executing the UDID service, a new UDID in response to determining that the one or more devices are not found from retrieving the any of the previously-observed devices; and assigning, with the electronic processor executing the UDID service, the new UDID to the currently-observed device.

Example 12: the method of Example 11, further comprising: storing, with the electronic processor executing the UDID service, the new UDID and the first set of device attributes in a database.

Example 13: the method of any of Examples 10-12, further comprising: storing, with the electronic processor executing the UDID service, the UDID and the first set of device attributes in a database.

Example 14: the method of any of Examples 10-13, wherein the one or more devices that are found from retrieving the any of the previously-observed devices include respective one or more sets of device attributes.

Example 15: the method of Example 14, wherein determining the all changed device attributes for the each device of the one or more devices that are found relative to the first set of device attributes further includes comparing each of the respective one or more sets of device attributes to the first set of device attributes to determine the all changed device attributes between the respective one or more sets of device attributes and the first set of device attributes.

Example 16: the method of Example 15, wherein the first set of device attributes and the respective one or more sets of device attributes individually include a plurality of device attributes selected from a group consisting of: an internet protocol (IP) address attribute, a location attribute, a screen resolution attribute, an operating system type attribute, an operating system version attribute, a browser type attribute, and a time zone attribute.

Example 17: the method of Example 16, wherein the adjusted attribute distance that is generated has a value between one and one-hundred, wherein the adjusted attribute distance is indicative of the smallest change between the currently-observed device and the one or more devices when the value is one, and wherein the adjusted attribute distance is indicative of the largest change between the currently-observed device and the one or more devices when the value is one-hundred.

Example 18: the method of Example 17, wherein the adjusted attribute distance has the value of one when the all changed device attributes includes only the IP address attribute, the location attribute, and the time zone attribute, wherein the adjusted attribute distance has the value of ten when the all changed device attributes includes only the screen resolution attribute, wherein the adjusted attribute distance has the value of one-hundred when the all changed device attributes includes only the operating system type attribute, wherein the adjusted attribute distance has the value of fifty when the all changed device attributes includes only the IP address attribute and the browser type attribute, and wherein the adjusted attribute distance has the value of five when the all changed device attributes includes only the IP address attribute and the operating system version attribute.

Example 19: a non-transitory computer-readable medium comprising instructions that, when executed by a server, causes the server to perform a set of operations of a universal device identifier (UDID) service, the set of operations comprising: receiving an identification request regarding a currently-observed device having a first set of device attributes; retrieving any previously-observed devices with device attributes within a threshold attributes distance based on the first set of device attributes; determining whether one or more devices are found from retrieving the any of the previously-observed devices; determining all changed device attributes for each device of the one or more devices that are found relative to the first set of device attributes; generating an adjusted attribute distance corresponding to the all changed device attributes for the each device of the one or more devices that are found; retrieving a UDID of a closest device of the one or more devices that are found, the closest device having a lowest adjusted attribute distance among all adjusted attribute distances that are generated; and assigning the UDID of the closest device to the currently-observed device.

Example 20: the non-transitory computer-readable medium of Example 19, wherein the set of operations further includes creating a new UDID in response to determining that the one or more devices are not found from retrieving the any of the previously-observed devices; and assigning the new UDID to the currently-observed device.

It is to be understood that the embodiments are not limited in its application to the details of the configuration and arrangement of components set forth herein or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more electronic processors, one or more computer-readable medium modules, one or more input/output interfaces, and various connections (e.g., a system bus) connecting the various components.

Thus, embodiments described herein provide, among other things, universal device identifier (UDID) service with adjusted attribute distances. Various features and advantages are set forth in the following claims.

What is claimed is:

1. A server comprising:
    an electronic processor; and
    a memory, the memory including a universal device identifier (UDID) service,
    wherein, when executing the UDID service, the electronic processor is configured to
        receive an identification request regarding a currently-observed device having a first set of device attributes,
        retrieve any previously-observed devices with device attributes within a threshold attributes distance based on the first set of device attributes,
        determine whether one or more devices are found from retrieving the any of the previously-observed devices,
        determine all changed device attributes for each device of the one or more devices that are found relative to the first set of device attributes,
        generate an adjusted attribute distance corresponding to the all changed device attributes for the each device of the one or more devices that are found,
        retrieve a UDID of a closest device of the one or more devices that are found, the closest device having a lowest adjusted attribute distance among all adjusted attribute distances that are generated, and
        assign the UDID of the closest device to the currently-observed device.

2. The server of claim 1, wherein, when executing the UDID service, the electronic processor is configured to
    create a new UDID in response to determining that the one or more devices are not found from retrieving the any of the previously-observed devices, and
    assign the new UDID to the currently-observed device.

3. The server of claim 1, wherein, when executing the UDID service, the electronic processor is further configured to store the UDID and the first set of device attributes in a database.

4. The server of claim 1, wherein the one or more devices that are found from retrieving the any of the previously-observed devices include respective one or more sets of device attributes.

5. The server of claim 2, wherein, when executing the UDID service, the electronic processor is further configured to store the new UDID and the first set of device attributes in a database.

6. The server of claim 4, wherein, to determine the all changed device attributes for the each device of the one or more devices that are found relative to the first set of device attributes, the electronic processor is further configured to compare each of the respective one or more sets of device attributes to the first set of device attributes to determine the all changed device attributes between the respective one or more sets of device attributes and the first set of device attributes.

7. The server of claim 6, wherein the first set of device attributes and the respective one or more sets of device attributes individually include a plurality of device attributes selected from a group consisting of:
    an internet protocol (IP) address attribute,
    a location attribute,
    a screen resolution attribute,
    an operating system type attribute,
    an operating system version attribute,
    a browser type attribute, and
    a time zone attribute.

8. The server of claim 7, wherein the adjusted attribute distance that is generated has a value between one and one-hundred, wherein the adjusted attribute distance is indicative of the smallest change between the currently-observed device and the one or more devices when the value is one, and wherein the adjusted attribute distance is indicative of the largest change between the currently-observed device and the one or more devices when the value is one-hundred.

9. The server of claim 8, wherein the adjusted attribute distance has the value of one when the all changed device attributes includes only the IP address attribute, the location attribute, and the time zone attribute, wherein the adjusted attribute distance has the value of ten when the all changed device attributes includes only the screen resolution attribute, wherein the adjusted attribute distance has the value of one-hundred when the all changed device attributes includes only the operating system type attribute, wherein the adjusted attribute distance has the value of fifty when the all changed device attributes includes only the IP address attribute and the browser type attribute, and wherein the adjusted attribute distance has the value of five when the all changed device attributes includes only the IP address attribute and the operating system version attribute.

10. A method comprising:
    receiving, with an electronic processor executing a universal device identifier (UDID) service, an identification request regarding a currently-observed device having a first set of device attributes;
    retrieving, with the electronic processor executing the UDID service, any previously-observed devices with device attributes within a threshold attributes distance based on the first set of device attributes;
    determining, with the electronic processor executing the UDID service, whether one or more devices are found from retrieving the any of the previously-observed devices;
    determining, with the electronic processor executing the UDID service, all changed device attributes for each device of the one or more devices that are found relative to the first set of device attributes;
    generating, with the electronic processor executing the UDID service, an adjusted attribute distance corresponding to the all changed device attributes for the each device of the one or more devices that are found;
    retrieving, with the electronic processor executing the UDID service, a UDID of a closest device of the one or more devices that are found, the closest device having a lowest adjusted attribute distance among all adjusted attribute distances that are generated; and
    assigning, with the electronic processor executing the UDID service, the UDID of the closest device to the currently-observed device.

11. The method of claim 10, further comprising:
    creating, with the electronic processor executing the UDID service, a new UDID in response to determining that the one or more devices are not found from retrieving the any of the previously-observed devices; and
    assigning, with the electronic processor executing the UDID service, the new UDID to the currently-observed device.

12. The method of claim 10, further comprising:
storing, with the electronic processor executing the UDID service, the UDID and the first set of device attributes in a database.

13. The method of claim 10, wherein the one or more devices that are found from retrieving the any of the previously-observed devices include respective one or more sets of device attributes.

14. The method of claim 11, further comprising:
storing, with the electronic processor executing the UDID service, the new UDID and the first set of device attributes in a database.

15. The method of claim 13, wherein determining the all changed device attributes for the each device of the one or more devices that are found relative to the first set of device attributes further includes comparing each of the respective one or more sets of device attributes to the first set of device attributes to determine the all changed device attributes between the respective one or more sets of device attributes and the first set of device attributes.

16. The method of claim 15, wherein the first set of device attributes and the respective one or more sets of device attributes individually include a plurality of device attributes selected from a group consisting of:
an internet protocol (IP) address attribute,
a location attribute,
a screen resolution attribute,
an operating system type attribute,
an operating system version attribute,
a browser type attribute, and
a time zone attribute.

17. The method of claim 16, wherein the adjusted attribute distance that is generated has a value between one and one-hundred, wherein the adjusted attribute distance is indicative of the smallest change between the currently-observed device and the one or more devices when the value is one, and wherein the adjusted attribute distance is indicative of the largest change between the currently-observed device and the one or more devices when the value is one-hundred.

18. The method of claim 17, wherein the adjusted attribute distance has the value of one when the all changed device attributes includes only the IP address attribute, the location attribute, and the time zone attribute, wherein the adjusted attribute distance has the value of ten when the all changed device attributes includes only the screen resolution attribute, wherein the adjusted attribute distance has the value of one-hundred when the all changed device attributes includes only the operating system type attribute, wherein the adjusted attribute distance has the value of fifty when the all changed device attributes includes only the IP address attribute and the browser type attribute, and wherein the adjusted attribute distance has the value of five when the all changed device attributes includes only the IP address attribute and the operating system version attribute.

19. A non-transitory computer-readable medium comprising instructions that, when executed by a server, causes the server to perform a set of operations of a universal device identifier (UDID) service, the set of operations comprising:
receiving an identification request regarding a currently-observed device having a first set of device attributes;
retrieving any previously-observed devices with device attributes within a threshold attributes distance based on the first set of device attributes;
determining whether one or more devices are found from retrieving the any of the previously-observed devices;
determining all changed device attributes for each device of the one or more devices that are found relative to the first set of device attributes;
generating an adjusted attribute distance corresponding to the all changed device attributes for the each device of the one or more devices that are found;
retrieving a UDID of a closest device of the one or more devices that are found, the closest device having a lowest adjusted attribute distance among all adjusted attribute distances that are generated; and
assigning the UDID of the closest device to the currently-observed device.

20. The non-transitory computer-readable medium of claim 19, wherein the set of operations further includes
creating a new UDID in response to determining that the one or more devices are not found from retrieving the any of the previously-observed devices; and
assigning the new UDID to the currently-observed device.

* * * * *